US012256125B2

(12) United States Patent
Shem Tov

(10) Patent No.: US 12,256,125 B2
(45) Date of Patent: Mar. 18, 2025

(54) AUDIENCE FEEDBACK FOR LARGE STREAMING EVENTS

(71) Applicant: YAHOO ASSETS LLC, Dulles, VA (US)

(72) Inventor: Ofer Shem Tov, Tel Aviv (IL)

(73) Assignee: YAHOO ASSETS LLC, New York, NY (US)

( * ) Notice: Subject to any disclaimer, the term of this patent is extended or adjusted under 35 U.S.C. 154(b) by 0 days.

(21) Appl. No.: 17/241,172

(22) Filed: Apr. 27, 2021

(65) Prior Publication Data

US 2022/0345780 A1  Oct. 27, 2022

(51) Int. Cl.
*H04N 21/462* (2011.01)
*H04N 21/466* (2011.01)

(52) U.S. Cl.
CPC ....... *H04N 21/462* (2013.01); *H04N 21/4662* (2013.01)

(58) Field of Classification Search
CPC .......... H04N 21/462; H04N 21/4662
See application file for complete search history.

(56) References Cited

U.S. PATENT DOCUMENTS

| | | | | |
|---|---|---|---|---|
| 10,158,917 | B1* | 12/2018 | Logan | H04N 21/4788 |
| 10,897,647 | B1* | 1/2021 | Hunter Crawley | H04N 21/44 |
| 2013/0305158 | A1* | 11/2013 | Vasquez | H04N 21/4788 715/733 |
| 2016/0198238 | A1* | 7/2016 | Hajiyev | H04N 21/4532 725/12 |
| 2016/0286244 | A1* | 9/2016 | Chang | H04N 21/4788 |
| 2016/0366203 | A1* | 12/2016 | Blong | H04N 21/42203 |
| 2019/0044988 | A1* | 2/2019 | Oesterreicher | H04N 21/4223 |
| 2019/0268668 | A1* | 8/2019 | Moskovchenko | H04N 21/2187 |
| 2020/0005046 | A1* | 1/2020 | Attorre | G06V 20/41 |
| 2020/0273485 | A1* | 8/2020 | Jagmag | H04N 21/422 |

* cited by examiner

*Primary Examiner* — Randy A Flynn
(74) *Attorney, Agent, or Firm* — James J. DeCarlo; Greenberg Traurig, LLP

(57) ABSTRACT

The disclosed embodiments are directed toward local emotion detection during live streaming events. A client device receives a video stream from a remote server and captures media content while displaying the video stream. The client device uses a local machine learning/artificial intelligence event detection model to detect events in the media content. The client device then transmits detected events to the remote server involved in the live stream. The client device may additionally stream the locally captured media content to the remote server. In response, the remote server provides an interaction dashboard and, in some embodiments, mixes the local media content with the live stream.

20 Claims, 6 Drawing Sheets

AUDIENCE FEEDBACK FOR LARGE STREAMING EVENTS

BACKGROUND INFORMATION

Network-based streaming video platforms are increasingly being used to simultaneously stream live events to multiple users. Indeed, some such live events (e.g., concerts, performances, etc.) may be streamed to thousands or millions of viewers. Current streaming solutions provide no mechanism to enable feedback to presenters who stream to large numbers of users. Indeed, most such systems explicitly do not capture audio or video of viewers due to the large amount of data needed to fully process each of the users (of potentially millions).

DETAILED DESCRIPTION OF EXAMPLE EMBODIMENTS

Figure 1:
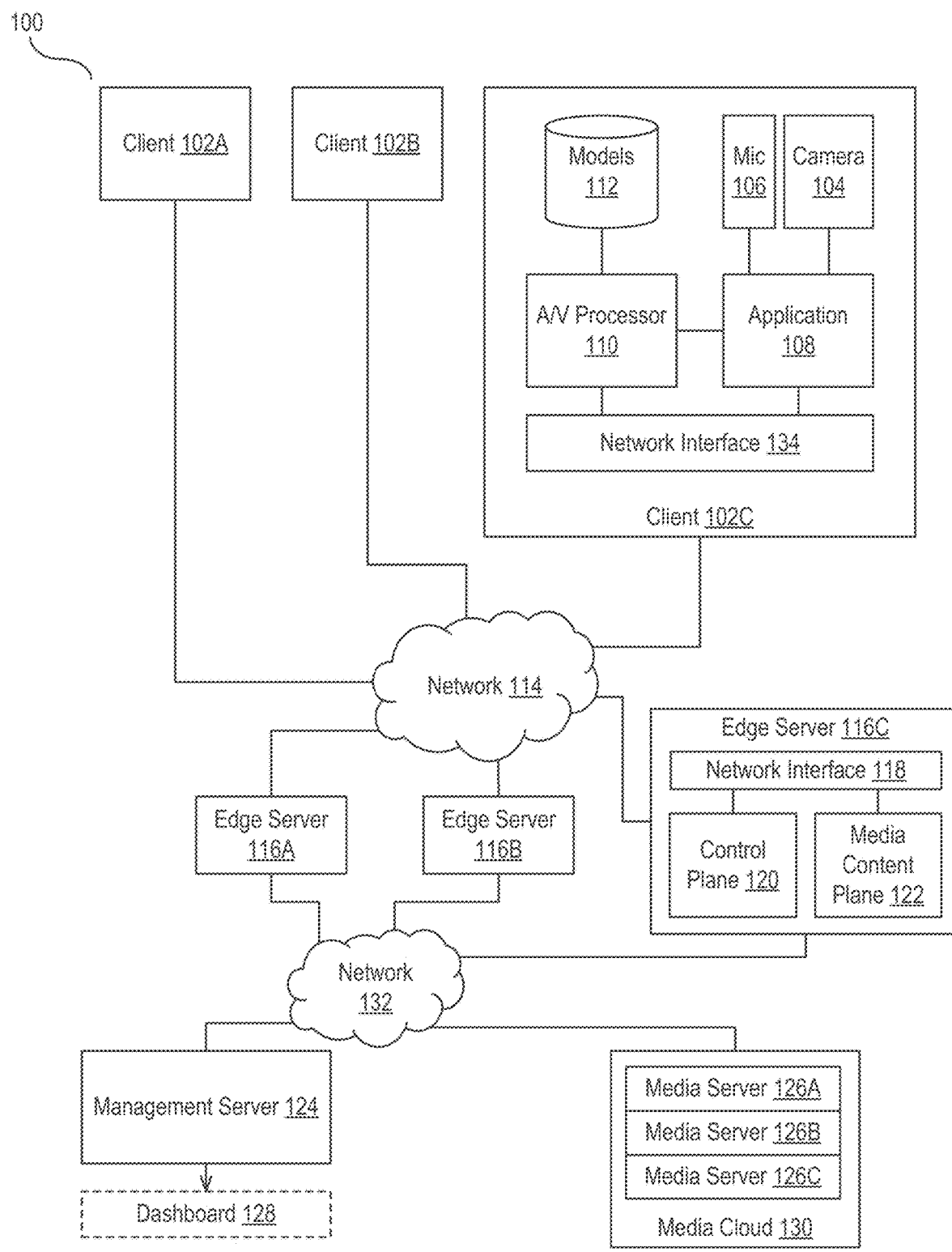
FIG. 1 is a block diagram illustrating a system for providing user feedback in a large-scale video streaming application according to some of the disclosed embodiments.

The disclosed embodiments allow users (e.g., performers or presenters) to obtain real or near real-time feedback from large audiences in online live events. The feedback can comprise predicted emotion data of users for engagement analysis as well as selected viewers' real or near real-time video and audio to make the experience mimic a physical, live event.

As a viewer is watching a live event on a client device (e.g., laptop/desktop, mobile phone, smart TV, augmented reality (AR) or virtual reality (VR) headsets or glasses, or other devices) using low latency (e.g., sub-second) technology, artificial intelligence (AI)/machine learning (ML) code can be running on the client device and analyzing the viewer video and audio coming from the viewer's device camera and microphone. The viewer's posture and emotions can be detected from the viewer's video and audio, and this information can be sent from all or a chosen fraction of users to the server. The server can analyze this data to determine an engagement level for the event and can also ask for, or access, selected viewers' real-time (or near real-time) video and audio. In some embodiments, the engagement level can be adjusted or weighted based on the type of event (e.g., comedy versus education events). This audio and/or video can be presented to the event presenter/performer as human feedback and can also be mixed to create audience noises such as applause and laughter or event general ambient noise. This audio/visual feedback can also be presented back to the other viewers of the live event. In some embodiments, the viewer can utilize privacy controls to prevent the analysis of audio and/or video or to prevent sending audio and/or video to the server. The viewer can also be notified when its video/audio is sent to the server and when it is actually consumed by the server or viewable by the presenter/performer and other viewers.

The disclosed embodiments provide methods, non-transitory computer-readable storage media, devices, and systems for live streaming large-scale events with audience feedback.

A client device receives a video stream from a remote server and captures or records media content while displaying the video stream in one embodiment. The client device then detects an event in the media content using an event detection model, where each event is associated with a label. Finally, the client device transmits the event to the remote server.

In one embodiment, the client device can detect that permission is enabled before capturing the media content. The permission allows for the transmitting of the event to the remote server. In another embodiment, the client device can join an event associated with the video stream, where the joining comprises registering with the remote server before receiving the video stream. In one embodiment, the client device can transmit the media content to the remote server. Further, in another embodiment, the client device can determine that another permission is enabled before capturing the media content. The other permission allows transmission of the media content to the remote server. In one embodiment, the client device can capture audio, video, or image media content (or a combination thereof). In one embodiment, the client device can detect an event using an event detection model that includes assigning the label to the media content based on a detected emotion in the media content.

Further, in some embodiments, a remote system (including the remote server) is disclosed for live streaming the event and processing data transmitted from client devices. In one embodiment, the remote system receives data from the client device (e.g., event data, audio data, and video data) and augments the live stream experience accordingly. For example, the remote system can provide a dashboard that displays real-time (or near real-time) event data from clients. In some embodiments, this event data is aggregated across all clients. Alternatively, or in conjunction with the preceding, the remote system can display video streams received from selected clients. In another embodiment, the remote system can mix audio captured by clients (e.g., laughter) into the event stream to simulate a real-time (or near real-time) audience.

FIG. 1 is a block diagram illustrating a system 100 for providing user feedback in a large-scale video streaming application according to some of the disclosed embodiments.

In the illustrated embodiment, system 100 includes a plurality of client devices (e.g., client 102*a*, client 102*b*, client 102*c*, etc.) that communicate via a network interface 134. Network interface 134 facilitates communications between the client devices and one or edge servers (e.g., edge server 116*a*, edge server 116*b*, edge server 116*c*, etc.). On the server-side, a management server 124 manages video streams, data received from clients (e.g., event data or media data), and provides APIs for dashboard 128 as well as media servers (e.g., 126*a*, 126*b*, 126*c*). Although illustrated as a single device, the management server 124 may comprise a plurality of physical or virtualized/containerized instances. In some embodiments, the instances may be redundant (i.e., each instance performs the same operations). In other embodiments, the instances may implement distinct functionality (e.g., one instance can receive client events while another can handle WebRTC connections) and communicate among one another to implement the total functionality of the management server 124.

In the illustrated embodiment, a plurality of media servers (e.g., media server 126a, media server 126b, media server 126c, etc.) stream media (e.g., audio, video, etc.) through the edge servers to the client devices. In the illustrated embodiment, the media servers receive commands regarding streams to be distributed to clients and mix media in response to commands, as will be discussed. In the illustrated embodiment, the media servers (e.g., 126a, 126b, 126c) may provide their own APIs to enable the management server 124 to control the media delivery services performed by the media servers (e.g., 126a, 126b, 126c). For example, the management server 124 may access an API of a media server and provide client-captured media content to mix into a broadcast video stream. In the illustrated embodiment, the client devices receive the media and transmit events and locally captured media back to the media servers. In some alternatives, some or all of the functionality of management server 124 may be included as part of media servers (e.g., 126a, 126b, 126c).

In the illustrated embodiment, the client devices (e.g., 102a, 102b, 102c) can comprise any end-user computing device. For example, client 102a can comprise a laptop or desktop computing device; client 102b can comprise a smart television, and client 102c can comprise a portable computing device (e.g., mobile phone, tablet, etc.) or AR/VR headsets or glasses. The disclosed embodiments are not limited to specific types of end-user computing devices, and the preceding types of devices are only provided as examples.

A given client includes various subcomponents. FIG. 1 illustrates the components of client 102c. However, client 102a and client 102b may include similar or identical components. The description of client 102c is thus equally applicable to client 102a and client 102b. Further, client 102a, client 102b, and client 102c can include additional components other than that illustrated in FIG. 1, as discussed more fully in the description of FIG. 6.

In the illustrated embodiment, a given client 102c includes a camera 104, microphone 106, streaming application 108, audio/video processor 110, model storage 112, and network interface 134.

In one embodiment, the streaming application 108 comprises a software application that joins a live stream by communicating with the management server 124 over network interface 134. In one embodiment, the streaming application 108 transmits messages to the management server 124 to join a given live stream. As used herein, a live stream refers to live broadcasting of media content (e.g., video, audio, text, image, or combination) to end-user devices operating client devices such as client 102c. Examples of live streams include, but are not limited to, concert broadcasts, company-wide meetings, comedy shows, etc. In some embodiments, live streams may also include smaller video conferences between a limited number of participants, and thus, the disclosed embodiments are not limited to large broadcast events but can be equally applicable to smaller video conferences. In some embodiments, the disclosed embodiments are equally applicable to pre-recorded broadcasts. For example, television shows or movies may be streamed using the disclosed embodiments.

In one embodiment, the streaming application 108 can allow a user to perform various operations with respect to playing back an event stream. For example, the streaming application 108 can allow the user to control the event stream (e.g., rewind, pause, etc.), mute their own capture, show their locally captured or recorded video, etc. In some embodiments, the streaming application 108 includes a software developer kit (SDK) that performs the various operation described further herein, such as smile detection, clap detection, and the transmittal of such data to remote endpoints.

After the streaming application 108 joins a stream, the streaming application 108 receives media content from one or more media servers in the media cloud 130. In one embodiment, the streaming application 108 may utilize a WebRTC protocol to communicate with one or more media servers in the media cloud 130. However, in other embodiments, other protocols may be used. In the illustrated embodiment, the streaming application 108 causes the display of media content on a display (not illustrated) of the client 102c. The foregoing description of streaming media content is brief and used as an example. In general, any low latency streaming technology may be used to join and display event streams, and the disclosure is not particularly limited to a specific technology.

In the illustrated embodiment, the streaming application 108 receives data from microphone 106 and camera 104. In one embodiment, the microphone 106 is configured to capture audio while the streaming application 108 streams media content. Further, in one embodiment, camera 104 is configured to capture still images and/or video content while the streaming application 108 streams media content. In one embodiment, the microphone 106 thus captures ambient sound while streaming, including utterances by the user of the client 102c. For example, microphone 106 can capture laugher, clapping, gasps, and other non-verbal ambient sounds. Certainly, the microphone 106 may also capture verbal utterances, including, but not limited to, answers to questions, impromptu statements, exclamations, etc. Similarly, camera 104 captures still images and/or video content during an event stream. In one embodiment, camera 104 comprises a user-facing camera. For example, camera 104 may comprise a camera situated above the screen of a laptop, an external webcam, an embedded mobile device camera, etc. In one embodiment, camera 104 captures still images and/or video content of the user viewing the live stream.

In the illustrated embodiment, the streaming application 108 receives the media content from the camera 104 and microphone 106 when enabled. In one embodiment, the streaming application 108 may only receive data from the camera 104 and microphone 106 upon receiving explicit permission from the user of the client 102c. Thus, the streaming application 108 may selectively enable and disable the camera 104 and microphone 106.

In one embodiment, the streaming application 108 forwards the media content to the audio/video processor 110. In one embodiment, the audio/video processor 110 accesses artificial intelligence (AI) and machine learning (ML) models stored in model storage 112 to classify the media content. In one embodiment, the audio/video processor 110 classifies the media content into categories of emotions (e.g., sad, happy, etc.). Alternatively, or in conjunction with the foregoing, the audio/video processor 110 can classify the media content into a specific categorical act (e.g., laughing, crying, clapping, yelling, etc.). Alternatively, or in conjunction with the foregoing, the audio/video processor 110 can stream media content back to a remote server while simultaneously streaming the event. These and other aspects of the audio/ video processor 110 are described in the descriptions of FIGS. 2 and 3, which are incorporated in their entirety.

The client devices (e.g., 102a, 102b, 102c) communicate with various remote computing devices or servers over a network 114. In one embodiment, network 114 comprises a wide area network (WAN) such as the Internet.

In the illustrated embodiment, a plurality of edge servers is communicatively coupled to network 114. Although only three edge servers are illustrated, the disclosed embodiments are not limited to such an amount. In the illustrated embodiment, an edge server comprises a server (or set of servers) that are situated on the "edge" of a network (e.g., network 114). In one embodiment, an edge of a network comprises a location physically near a client device. For example, edge servers may be installed in cellular base stations.

In the illustrated embodiment, a given edge server (e.g., the edge server 116b) includes a network interface 118, control plane functionality 120, and media content plane functionality 122. In the illustrated embodiment, the edge server 116c receives control data via control plane functionality 120 via network interface 118 and routes such data to, for example, management server 124. Similarly, a given edge server 116c receives media content from both client devices and media servers and routes media content among the devices.

In the illustrated embodiment, a management server 124 and media cloud 130 are communicatively coupled to the edge servers via network 132. In some embodiments, network 132 may comprise network 114. In other embodiments, network 132 may comprise a separate physical or logical network. For example, network 132 may comprise a virtual private network or a core network of a cellular network.

In the illustrated embodiment, the management server 124 manages live streams from the media cloud 130. In one embodiment, the management server 124 manages the operations of the client devices (e.g., 102a, 102b, 102c), edge servers (e.g., 116a, 116b, 116c), and the media cloud 130. In some embodiments, the management server 124 can direct a given client device to the optimal edge server. For example, a given client 102c may communicate with the management server 124 through a first edge server 116a. In response, the management server 124 can instruct the client 102c to communicate with an alternative edge server 116c. The management server 124 can transmit such an instruction to, for example, alleviate congestion on a given edge server.

In some embodiments, the management server 124 can receive events from the client devices. In one embodiment, the management server 124 receives events indicating that a given user of a client device is smiling. In response, the management server 124 may instruct the client device to transmit audio and/or video data to the media cloud 130 via the edge servers' media content plane (e.g., media content plane functionality 122). In response, a given media server in the media cloud 130 may execute a laughter detection process to determine if an audio or video clip includes laughter. If so, the media server may mix audio of the laughter into the live stream. In an alternative embodiment, the client may transmit audio and/or video data to the management server 124, which may forward the audio and/or video to the media cloud 130.

In one embodiment, the management server 124 may expose an application programming interface (API). In one embodiment, the API comprises a Representational State Transfer (REST) API. In the illustrated embodiment, the API may allow a given device to control a streaming session. For example, the API may allow a device to register or connect to a streaming endpoint (e.g., a WebRTC endpoint). As another example, the API may allow a requestor to obtain a listing of client devices connected to a stream. In some embodiments, this request may include various filters that allow a requestor to filter a listing of client devices by engagement (e.g., all users of client devices that have smiled, frowned, etc.). In some embodiments, the filter may be an aggregate filter; that is, the filter may request all users that have performed an action a number of times above a threshold (e.g., all users who have laughed at least three times, etc.).

As another example, the management server 124 may request the retrieval of media content from client devices. The management server 124 can request permission from the client devices through the edge servers. In response, if the client devices grant such permission, the client devices may capture and stream media content to the media servers 126a, 126b, 126c (or, in some embodiments, to the management server 124). In some embodiments, the media servers may then mix the audio and/or video into the existing live stream.

In the illustrated embodiment, the media cloud 130 includes a plurality of media servers, including media server 126a, media server 126b, and media server 126c. In the illustrated embodiment, a given media server includes hardware and/or software for delivering a media stream to a client device. For example, a Kurento® server may be used to implement the media server.

In the illustrated embodiment, each of the media servers (e.g., 126a, 126b, 126c) can register with the management server 124. In one embodiment, by registering with the management server 124, the media servers can synchronize audio and/or video data captured or captured by clients with existing event streams. In one embodiment, the media servers (e.g., 126a, 126b, 126c) receive this data from either the management server 124 or directly from the clients via the edge servers (if the media servers implement the functionality of the management server 124). In one embodiment, the media servers (e.g., 126a, 126b, 126c) are configured to mix received audio and/or video into an existing live stream. Alternatively, or in conjunction with the foregoing, the media servers (e.g., 126a, 126b, 126c) may be configured to store media content received from client devices.

In one embodiment, the management server 124 may further provide a front-end dashboard 128 to end-users that are streaming content. Such end-users may include, for example, performers of a live event or content owners of pre-recorded media. In one embodiment, the management server 124 stores received event and media content from client devices and provides a dashboard 128 depicting the events. An example of a dashboard 128 is provided in FIG. 5. In brief, the management server 124 may provide a dashboard 128 that lists aggregated or individual events detected by clients. In some embodiments, the dashboard 128 may also stream received media content captured locally by the clients. Further, the management server 124 may display mixed content (e.g., client-captured laughter mixed with an event stream). In the illustrated embodiment, dashboard 128 may comprise a web or mobile application that accesses an API to display data regarding an event to an end-user. In some embodiments, when the dashboard 128 is implemented as a web application, the dashboard may be served by either the management server 128 or via a separate server. However, in both web and mobile implementations, the API provides all underlying data used to populate the dashboard applications.

Figure 2:
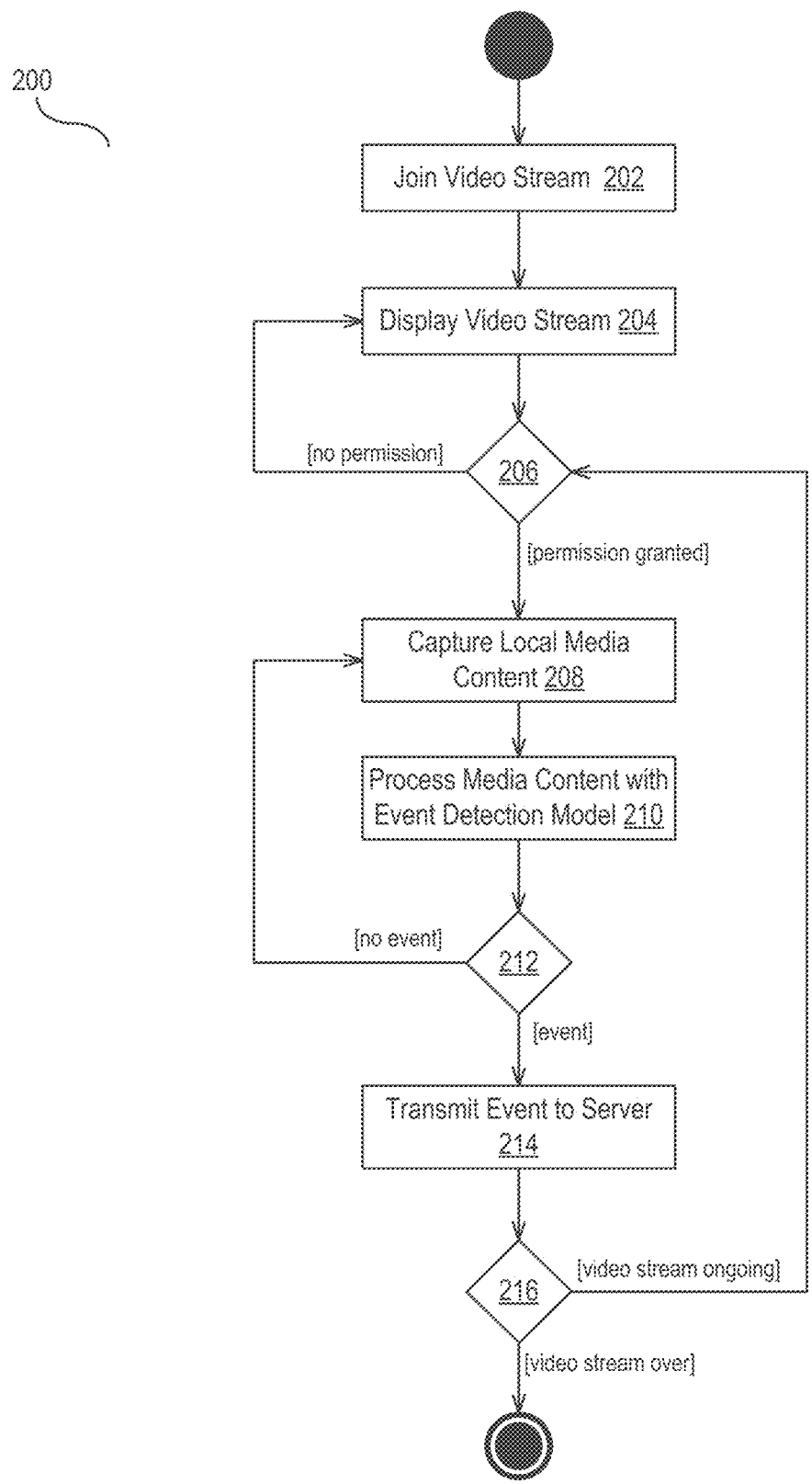
FIG. 2 is a flow diagram illustrating a method for detecting and transmitting events detected during a streaming event according to some of the disclosed embodiments.

FIG. 2 is a flow diagram illustrating a method 200 for detecting and transmitting events detected during a streaming event according to some of the disclosed embodiments. In one embodiment, a client device (e.g., 102c) performs method 200. In some embodiments, the streaming application 108 and audio/video processor 110 may, in part, perform method 200.

In step 202, method 200 can comprise joining a video stream. In one embodiment, the video stream is associated with a live event. In one embodiment, method 200 joins a video stream by registering with a management server. The management server, in turn, informs a media server of the client endpoint to stream the video stream. In one embodiment, joining a video stream comprises establishing a communications session between the media server and the client (including through any intermediaries such as edge servers). In one embodiment, a client identifier (e.g., user identifier) and network information (e.g., Internet Protocol address) are used to manage connections between media servers and client devices. In some embodiments, the management server stores all details describing the communications sessions in a persistent data store to enable managing uploaded event and media content data from client devices, as will be discussed.

In step 204, method 200 can comprise displaying the video stream. In one embodiment, a media server streams media content to a client device as part of an event. As described, an event may comprise a live event (e.g., concert, presentation, etc.) or a pre-recorded event (e.g., a movie or television show). In general, any multimedia content may be streamed as a video stream.

In step 206, method 200 can comprise determining that permission is enabled prior to capturing local media content. In one embodiment, the permission enables the transmitting of the event to the remote server.

In one embodiment, by default, a client device does not capture media content (e.g., audio, video, image data) while displaying the video stream. Thus, in such a mode, the client operates in a "view only" mode whereby stream content is displayed, but no captured data is transmitted by the client.

In some embodiments, the user may enable permission by selecting an associated user interface (UI) element (e.g., button, toggle, etc.). In response, the client may display an indication that capturing of media content is enabled by the device during the video stream (e.g., via an "on-air" UI element).

In the illustrated embodiment, the permission in step 206 may further enable the client device to perform AI/ML processing on the media content and transmit the results of the AI/ML processing to a remote endpoint, as described next.

In step 208, after the user enables capturing, method 200 can proceed to capture local media content. As discussed, method 200 may buffer media content captured via microphones or cameras. In one embodiment, method 200 utilizes a sampling interval to capture "batches" of media content data for further processing. In other embodiments, method 200 may stream captured media content for further processing. In one embodiment, the media content comprises an audio sample and/or a set of image frames.

In step 210, method 200 may comprise processing media content with an event detection model. In some embodiments, method 200 may process the media content with multiple event detection models.

In one embodiment, an event detection module comprises an AI/ML model that processing media content data and generates a label or classification for the media content. Various examples are provided herein, but the disclosure is not limited to specific models.

In one embodiment, method 200 processes the media content using a facial expression model. In one embodiment, a facial expression model receives the media content and labels the media content with a corresponding emotion label based on the facial expressions detected in the media content. For example, if the model detects a frown, it may label the media content as "sad" or "upset." In some embodiments, the facial expression model may output multiple tags with corresponding confidence levels. Thus, in the preceding example, the facial expression model may output both "sad" and "upset" with confidence levels of 0.9 and 0.6, correspondingly.

In another embodiment, method 200 processes the media content using a binary reaction model. In these embodiments, the binary reaction model classifies media content as a "positive" or "negative" reaction. In this embodiment, the binary reaction model may comprise a hard classification (e.g., either positive or negative, not both).

In another embodiment, method 200 processes the media content using a subject-matter understanding model. In this embodiment, the media content is analyzed to determine whether a user captured in the media content understands the video stream. In one embodiment, the subject-matter understanding model analyzes detected facial expressions and classifies the facial expressions as a binary label of understanding or not understanding.

In another embodiment, method 200 processes the media content using an eye detection model to identify a region of the display the user is focusing on. In this embodiment, method 200 generates a bounding box or coordinate of the video stream that the user is focusing on in the captured media content.

In another embodiment, method 200 processes the media content using a head movement model. In this embodiment, the head movement model classifies movements of a user's head in the media content (e.g., nodding, shaking no, shaking yes, etc.).

In another embodiment, method 200 processes the media content using a general movement model. In this embodiment, the general movement model classifies non-head movements (e.g., dancing, clapping, etc.) included in the media content.

In another embodiment, method 200 processes the media content using an eye tracking model. In this embodiment, an AR/VR headset (or glasses) or similar device can monitor a user's eye position and input the position into the eye tracking model. In some embodiments, the eye tracking model can be trained to classify a user's emotional or mental state (e.g., concentrating, distracted, excited due to pupil dilation, etc.). In some embodiments, the foregoing models (using data captured by cameras/microphones) can be combined with events detected via the eye tracking model.

Alternatively, or in conjunction with the foregoing, method 200 may detect events in audio data using an audio event model. For example, various audio event models may be applied to detect laughter, clapping, whistling, etc., and other events in audio data. Alternatively, or in conjunction with the foregoing, method 200 may use a speech-to-text detection algorithm to convert audio data into plaintext data and use this text as event data.

The foregoing models are exemplary and other models may be used. Further, method 200 may utilize the models in conjunction or in the alternative. Further, method 200 may operate the models in parallel or in series.

Each of the aforementioned models may comprise a deep learning model or similar model. In the illustrated embodiment, the models may be trained in a supervised manner using existing media content manually labeled. In some embodiments, existing media content may be clustered using an unsupervised classification routine and then labeled.

In the illustrated embodiments, the models are implemented at a client device. In some embodiments, the models are trained in a centralized, remote location and then transmitted to the client devices. Thus, while the models may be trained by a single entity, they may be executed independently by each client device. In general, the use of client-side models significantly reduces the computational complexity of a centralized system. That is, the computing power required to simultaneously perform event detection in a large event can be distributed equally to the number of participating clients. This shifting of AI/ML processing to the clients enables rapid feedback of detected events to the stream source. Nonetheless such functionality may be entirely or partially distributed outside the client device as bandwidth and processing power indicate.

In some embodiments, method 200 may utilize a model under the direction of the management server. Specifically, in some embodiments, the management server may instruct a client executing method 200 to perform specific event detections. For example, a management server may build a profile for a given client device that indicates that the user frequently laughs but rarely frowns. In this scenario, the management server may instruct the client to only perform laughter and smile detection and forego frown detection, thus freeing compute resources of the client.

In step 212, method 200 can determine if an event was detected in the captured local media content. In some embodiments, the outputs of one or more models may indicate the lack of an actionable event. If so, method 200 can continue to capture local media content (step 208) and process the local media content with an event detection mode (step 210). If, however, method 200 determines that an event was detected, method 200 proceeds to step 214. In some embodiments, step 212 may include determining if multiple events are detected simultaneously and if those multiple events are correlated. In some embodiments, method 200 may use a set of correlations to determine if a multi-event set matches a correlation. In some embodiment, the use of correlations may be performed by a client device or by a management server (e.g., as part of step 410). In some embodiments, if the use of correlations is performed by a management server, the correlations may be used across multiple client devices. For example, if a single event ("laugh") is detected, the confidence of this detection may be average. However, if a multi-event is detected ("laugh," "facing camera," and "smiling"), this three-event combination may indicate a higher confidence level, and thus method 200 may prioritize such a multi-event. In some embodiments described herein, a client device may be configured to increase a weighting of confidence base on past event detections. For example, a laugh event of a user of a client device that laughs frequently can be weighted heavier than a user of a client device that rarely laughs.

In step 214, method 200 transmits the event (or events) to a remote server, such as management server 124. In one embodiment, method 200 may package events before transmitting. In this embodiment, method 200 may include a timestamp of the video stream along with the event. In one embodiment, method 200 may include a time period (i.e., a start timestamp and length or end timestamp) along with the event. In various embodiments, method 200 can also add a user identifier or other client-identifying identifier in the transmitted event package. In one embodiment, method 200 continuously streams event data to a remote endpoint.

In step 216, method 200 determines if the video stream is ongoing (e.g., content is still being streamed and displayed on the client device). If so, method 200 returns to step 206 to determine if permission for event detection is still enabled. Notably, method 200 allows a user to enable and disable event detection at any point during the stream. As illustrated, once the video stream has been completed (either due to the stream ending or by the user exiting the stream), method 200 ends.

Figure 3:
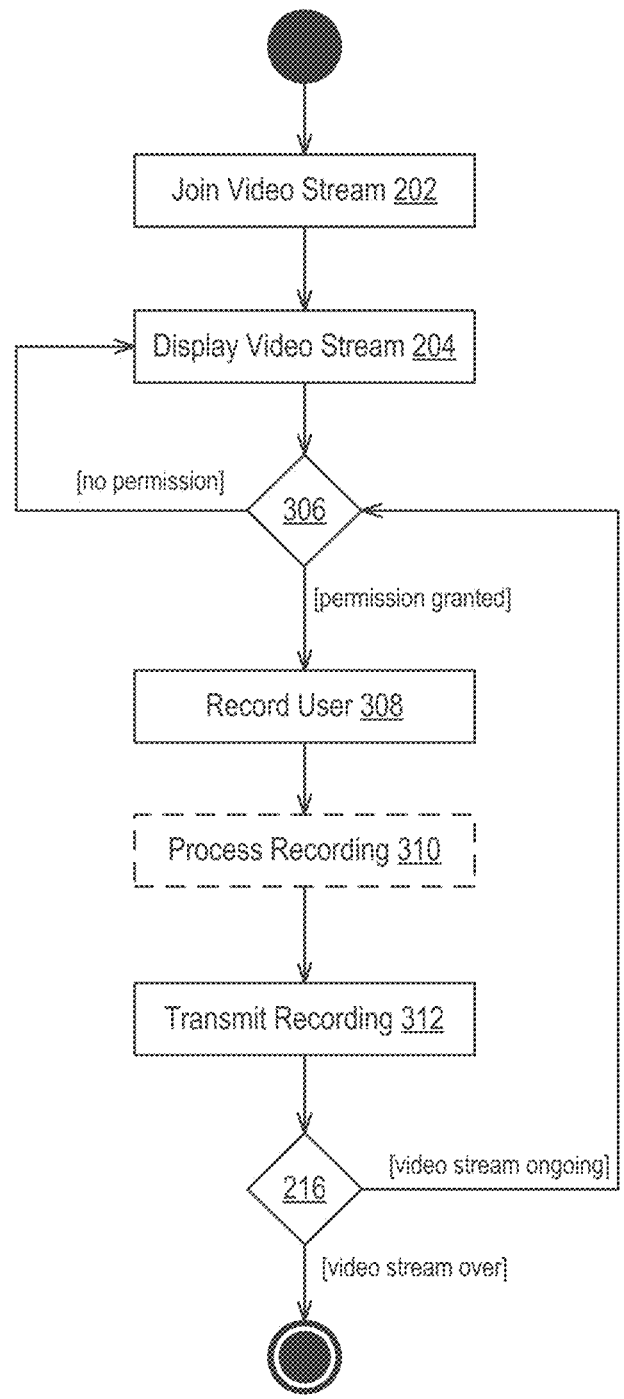
FIG. 3 is a flow diagram illustrating a method for streaming viewer audio and video during a streaming event according to some of the disclosed embodiments.

FIG. 3 is a flow diagram illustrating a method 300 for streaming viewer audio and video during a streaming event according to some of the disclosed embodiments.

In step 202 and step 204, method 300 can comprise joining a video stream and displaying the video stream, respectively. Details of these steps are described in FIG. 2 and are not repeated herein. Indeed, in some embodiments, the following steps 306 through 310 may be executed in parallel with method 200 of FIG. 2.

In step 306, method 300 can comprise determining that a second permission is enabled prior to recording local media content. In one embodiment, the permission enables the transmission of the media content to the remote server. As used herein, recording refers to the capturing and storing (even temporarily) audio/video of a user.

In one embodiment, by default, a client device does not record media content (e.g., audio, video, image data) while displaying the video stream. Thus, in such a mode, the client operates in a "view only" mode whereby stream content is displayed, but no recorded data is transmitted by the client. In some embodiments, the user may enable permission by selecting an associated user interface (UI) element (e.g., button, toggle, etc.). In response, the client may display an indication that recording of media content is enabled by the device during the video stream (e.g., via an "on-air" UI element).

Further, in the illustrated embodiment, the permission in step 306 may comprise permission to stream the locally recorded media content (or portions thereof) to a remote endpoint, as described herein.

In one embodiment, the user may be explicitly prompted to give permission in step 306. In one embodiment, a stream moderator can manually select client devices and request such client devices display or mix their audio. Alternatively, a device such as a management server 124 can automatically select client devices to request permission from. In this embodiment, method 300 may comprise displaying a popup, modal, or other dialog requesting permission.

In the illustrated embodiment, if the user denies permission for local recording and transmission of media content, method 300 continues to display the video stream.

In one embodiment, the request for permission can also include a signal to the client device requesting feedback. For example, the signal may indicate that the moderator of a stream requests applause, expects a response to a question, requests general noise, or requests the user dances. In some embodiments, these signals are associated with a given timestamp of the video stream, thus allowing users to respond at the appropriate time.

Alternatively, if the user enables permission to record, in step 308, method 300 proceeds to record media content (i.e., audio, video, or images) of the user while the user is viewing the video stream. As discussed above, method 300 may enable a microphone or camera of the client device to capture the media content.

In optional step 310, method 300 may process the recordings. As illustrated, this processing may be performed locally on the client device.

In one embodiment, method 300 may include allowing users to manipulate their audio and/or video before transmitting it. For example, users may choose to augment their media content with graphics, animations, other content. As another example, users may be able to fully replace their video with avatars or other character representations. As another example, users can change the pitch of their audio using a vocoder or similar technology. Of course, in some embodiments, step 310 may be optional or omitted, and users may stream the media content as it is recorded without change.

In step 312, method 300 can comprise transmitting the recording to a remote endpoint. In one embodiment, method 300 comprises setting up a "reverse" stream wherein client devices stream media content back to a remote endpoint (e.g., a management server 124). In one embodiment, a WebRTC session or similar protocol may be used to facilitate this reverse stream.

In some embodiments, steps 308, 310, and 312 may compensate for latency between a recording client and the management server 124. In a first embodiment, method 300 can buffer a pre-configured length of media content. In this embodiment, when sending media content in step 312, method 300 transmits media content that occurred earlier than the current timestamp of the event stream (i.e., the transmitted client media content is played back on the dashboard at a delay). In a second embodiment, a management server or client can predict a user's laughter using an ML model. In this embodiment, client-recorded or captured audio and/or video is input into a laughter detection model, and a user is classified as either a user that frequently or infrequently laughs. In one embodiment, method 300 can sample users that laugh more frequently and instruct the client devices of those users to record more media content for transmission (subject to permissions being granted by the corresponding users). In one embodiment, when a user is classified as frequently laughing and has enabled streaming media content, method 300 may immediately begin streaming all media content of the user to the management server to avoid a slow start time for streaming (e.g., which may occur when "toggling" between streaming and not streaming). In a third embodiment, a stream management server can detect a start of an emotion (e.g., laughing) and proactively instruct clients to stream media content. Then, upon detection of a crescendo or peak in the emotion, can forward the stream media content to the media servers. In some embodiments, method 300 can determine that a crescendo is reached using an ML model that is trained using emotional streams and corresponding broadcast streams. For example, the ML model can comprise a regression model that models the increase in the number of emotional events as a function of a broadcast stream. For example, a logistic regression model can be trained that predicts a rising number of laughs and a corresponding "peak." Thus, when the model begins receiving laughs, the model can trigger streaming of media content to media servers when the number of laughs meets a threshold defined in the logistic regression model. In other embodiments, a fixed percentage may be used (e.g., when 75% of users are laughing, the management server may instruct the media servers to mix in audience media content). Finally, in a fourth embodiment, which may be combined with the preceding, the client devices may immediately begin recording and buffering audio and video to compensate for latency during the start of a stream (e.g., a WebRTC stream). Although the preceding embodiments use laughter as an example, they are equally applicable to other emotions as discussed throughout.

In some embodiments, if the live stream comprises a stream involving a limited number of participants, such as a video conference, method 300 can immediately begin streaming video recorded in step 308. Specifically, in scenarios where the number of stream participants is small, method 300 can be configured to automatically stream all recorded (and allowed) audio and/or video given that the number of participants is small. Thus, in such scenarios, method 300 can reverse stream video conference participants' audio and/or video in real-time during the duration of the video conference without the need for additional client-side processing.

Alternatively, or in conjunction with the foregoing, method 300 may further comprising generating a face and/or body mesh based on the recorded video. In this embodiment, the face/body mesh comprises a set of points defining a three-dimensional representation of a face or body, respectively. In some embodiments, method 300 can transmit the detected mesh to the management server. As will be discussed in FIG. 4, this mesh can be further processed by the management server.

In step 216, method 300 determines if the video stream is ongoing (e.g., content is still being streamed and displayed on the client device). If so, method 300 returns to step 306 to determine if permission for reverse streaming is still enabled. Notably, method 300 allows a user to enable and disable reverse streaming at any point during the stream. As illustrated, once the video stream has been completed (either due to the stream ending or by the user exiting the stream), method 300 ends.

In some embodiments, the methods 200, 300 may be executed together. Specifically, in one embodiment, a user can provide separate permission (step 206) to capture video and perform event detection in step 210. The user can then provide a second permission (step 306) to enable the capturing and transmittal of media content. In this embodiment, if the user does not grant the first permission (step 206), the user cannot provide the second permission (step 306).

Figure 4:
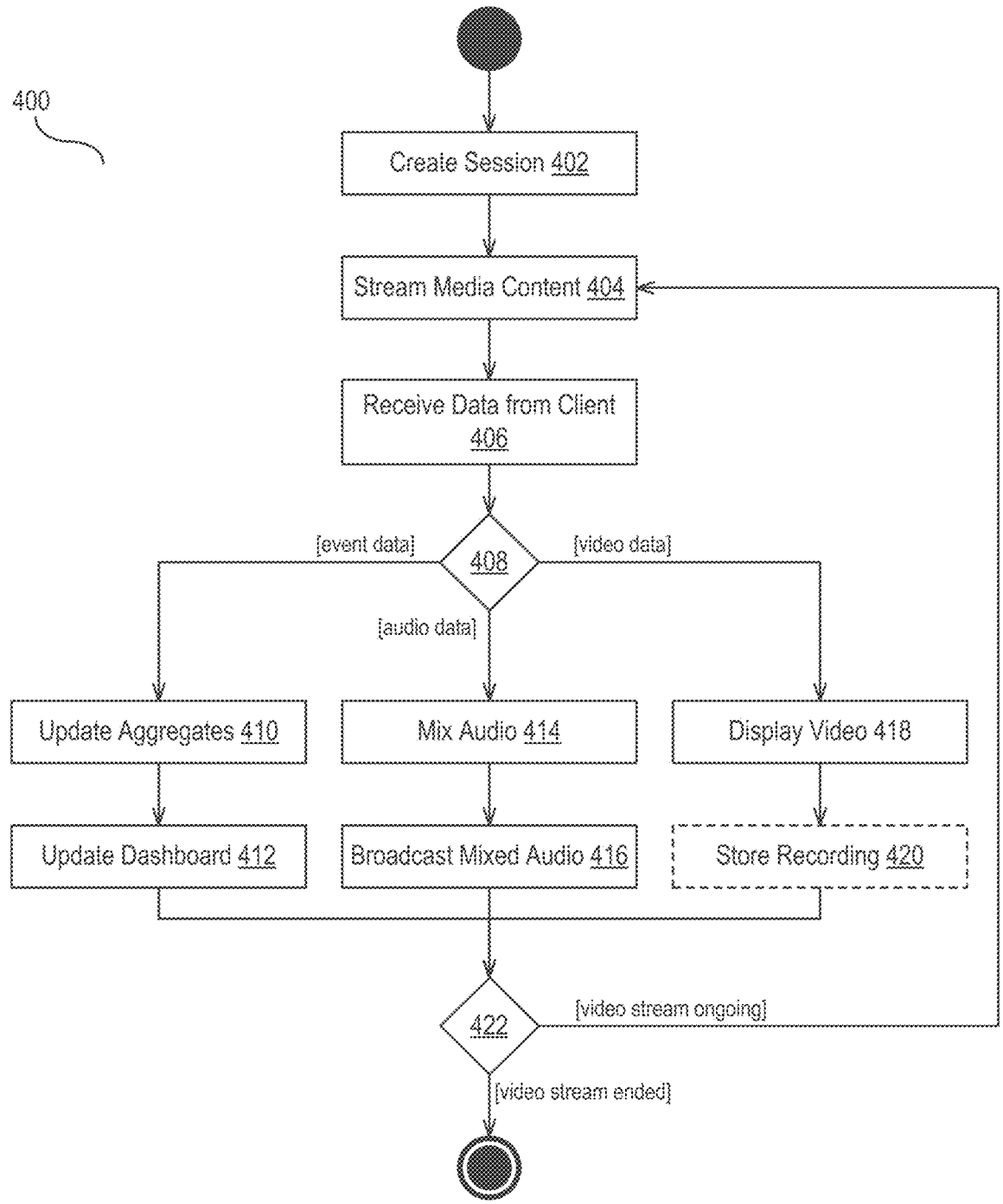
FIG. 4 is a flow diagram illustrating a method for processing viewer data received during a streaming event according to some of the disclosed embodiments.

FIG. 4 is a flow diagram illustrating a method 400 for processing viewer data received during a streaming event according to some of the disclosed embodiments.

In step 402, method 400 comprises creating a session. In one embodiment, a management server 124 or similar device may manage sessions between a media server (i.e., a stream moderator) and client devices. In one embodiment, the media servers register a new event with the management server 124, and client devices join the event by creating sessions with the management server 124. In one embodiment, the sessions comprise WebRTC sessions or similar sessions.

In step 404, after a session is established, method 400 can comprise streaming media content to client devices. In one embodiment, the media content streamed in step 404 may comprise live event media content or pre-recorded media content. Examples of live event media content comprise live performances, live news broadcasts, live comedy shows, etc. Examples of pre-recorded media content can include movies or television programs.

In step 406, method 400 receives data from a client that is receiving the media content streamed in step 404. As discussed, in some embodiments, method 400 may receive content directly from a client device. However, in other embodiments, method 400 may receive content from an intermediary device (e.g., edge server or management server).

In step 408, method 400 branches depending on the type of content received. As illustrated, method 400 may receive event data (e.g., the output of models as discussed in connection with FIG. 2), audio data, or video data.

In step 410 and step 412, method 400 processes the event data upon receipt. As discussed above, the event data may comprise the result of a classification of the locally captured media content of the client device. In some embodiments, all users viewing the broadcast can be ranked based on a level of engagement (e.g., events detected per second, etc.).

In step 410, method 400 updates aggregates based on the event. In general, an aggregate refers to a running count, tally, or other aggregation of an event type. For example, if an event indicates that a user has laughed, method 400 updates a total number of laughing events for a given stream. In one embodiment, method 400 may further timestamp and log all events to provide a timeline view. Thus, in addition to a total number of laughing events, method 400 may be able to present a timeline indicating when such events occurred during a stream.

In some embodiments, method 400 may further identify common feedback based on the events. As discussed previously, the events may include text content generated via a speech-to-text algorithm. In one embodiment, method 400 can classify and/or cluster the text content to identify the sentiment of received text content. For example, method 400 can identify common words or phrases and create a word bubble or similar visualization of the most common words or phrases.

In some embodiments, method 400 may further associate text content with questions presented to users. As discussed in FIG. 3, client devices may receive prompts for input. In response, the client device may capture the response (e.g., audio or video) and convert the response to text content. The client devices may then associate the text content with the input prompt and return the prompt and response (i.e., text content) as an event. In response, method 400 can aggregate the answers and provide a histogram or similar visualization of the responses. For example, method 400 may simulate the asking of a multiple-choice question and provide a histogram of answers determined via speech-to-text models running locally on the client devices.

In some embodiments, method 400 may count the number of users matching pre-defined criteria based on the events. For example, method 400 may count the number of "laughing" events or the number of users detected as viewing the screen.

Various other aggregates may be implemented, and the disclosure is not limited only to the specific examples provided above.

In step 412, After updating aggregates, method 400 updates a dashboard. In one embodiment, method 400 may provide a web- or app-based interface to allow a stream moderator to viewed data transmitted by clients. This dashboard can include the aggregates generated in step 410 as well as audio/video content as described in the following steps. Details of an example dashboard are provided in the description of FIG. 5 and are not repeated herein.

In step 414, if method 400 receives audio content, method 400 may mix the audio content into the streamed media content. Then, in step 416, method 400 may broadcast the mixed audio with the original video stream. In this manner, method 400 can incorporate (for example) user laughter in a broadcasted stream. In one embodiment, since a sub-second latency streaming architecture is used, method 400 can inject audio (e.g., laughter, claps, etc.) into a video stream within milliseconds of detecting such audio. Further, since client devices classify audio locally, method 400 receives audio that is pre-processed and classified as laughter. Thus, method 400 does not suffer from delays in classifying raw audio.

In some embodiments, method 400 may rely on an optional predictive step. In some embodiments, client devices may be equipped with a predictive model that classifies the frequency in which users perform certain events (e.g., laughing, clapping, etc.). In this embodiment, method 400 may selectively only receive audio data from such users. In this embodiment, method 400 may receive more frequent, relevant audio data and mix this data accordingly. In some embodiments, the more frequent users can be used to trigger uploading by all other users. In an alternative embodiment, the predictive step can be performed by a management server.

In some embodiments, method 400 may select audio to mix based on geographical locations of the clients, detected emotions, activity, or text to speech data. Alternatively, or in conjunction with the foregoing, method 400 may comprise selecting specific clients to mix audio based on aggregates associated with the user. For example, a user frequently classified as frowning may not be selected for audio mixing, while a user frequently classified as smiling may.

In the illustrated embodiment, method 400 may mix audio from multiple clients simultaneously, thus simulating an audience in the stream broadcasted in step 416.

In step 418 and step 420, method 400 receives video content and displays the video content in a dashboard. Optionally, in step 420, the method stores the received video content.

In step 418, method 400 may display one or more captured video streams received from the client devices. In one embodiment, the specific client devices selected may be chosen in a manner similar to that described with respect to step 414 and step 416, which is not repeated. For example, method 400 may select users more prone to laughter or other positive reactions to display video content. In one embodiment, method 400 may additionally comprise converting a viewer to a participant so the user can participate in the show in real-time with their video and audio.

As described above, in some embodiments, method 400 may be executed for a smaller scale stream such as a video conference. In such embodiment, method 400 may be employed alongside the display of participant video. In such embodiment, method 400 can use the detected emotions to adjust the presentation of participant videos. In existing video conferences, client video is generally displayed in a static "grid" or similar arrangement. In some existing systems, a currently speaking participant may be highlighted (e.g., by enlarging the video or highlighting a frame around the participant). In the illustrated embodiment, method 400 can provide further enhancement to the presentation of participant audio and/or video. For example, method 400 can use detected events (e.g., emotions) to determine an order for the displaying of participant video. As one example, during a video conference associated with an online classroom, method 400 can detect those users who are confused or are not facing the camera (i.e., are not paying attention) and highlight those video streams during the video conference (e.g., by positioning the streams in a prominent manner). Similarly, in a video conference, method 400 can prioritize those users with detected emotions (e.g., laughing, frowning, etc.) over users with no emotions detected. Various other arrangements can be applied alone or in combination with the foregoing, as discussed throughout.

As illustrated, in an optional step 422, method 400 may allow for the persistence of captured video (as well as audio or images). In this manner, if the stream is played back at a later date, the same content can be replayed or re-used (e.g., for audio mixing).

In some embodiments, as discussed, method 400 may receive a face or body mesh from a client device. In these embodiments, method 400 can further comprise generating a three-dimensional avatar using the mesh. Method 400 may then display the avatar in the dashboard or may, in some embodiments, mix the avatar into the broadcast. In some embodiments, mesh data is streamed from clients to method 400. Thus, method 400 can continuously update the avatars based on the live meshes. In some embodiments, the meshes can be combined with the underlying captured video to modify the video. For example, video frames can be cropped, resized, etc. to match the underlying mesh data. In some embodiments, videos modified using the mesh data can be aggregated and mixed into a broadcast stream (or broadcast separately). For example, a face/upper body mesh can be used to crop video frames to only include a user's face and body. Then, faces and bodies from multiple users can be combined to form a virtual audience. This virtual audience can then be re-broadcast along with (or mixed into) the broadcast stream. For example, if the broadcast stream comprises a basketball game, method 400 can build the virtual audience and display the virtual audience on courtside screens.

In some embodiments, method 400 may further comprise processing the media content for model improvements. For example, in some embodiments, method 400 receives both media content and detected emotions. These can be used as training data to further improve models that are ultimately transmitted to client devices. In some embodiments, method 400 may include manually tuning the training data prior to retraining. Further, as discussed above, recording detected emotions and media content can be used to profile users to classify the users based on the most common emotions detected. Then, a management server executing method 400 can instruct clients to only detect common emotions or may preemptively record media content (subject to permissions) of users that frequently generate events. Further, in some embodiments, new models can be constructed using the corpus of recorded media content and event detections. For example, a "furrowed brow" model can be built using media content that includes frown detections.

In some embodiments, the recorded media content can be used in a post-production application. In such an application, the live broadcast can be replayed, and the reverse streamed media content can also be displayed. In some embodiments, the application can allow for the creation of virtual audiences to accompanying a re-aired broadcast.

In some embodiments, method 400 may further include broadcasting the selected video content back to the client devices. For example, the media content can be either mixed into the live broadcast stream or displayed on a second screen or multiple second screens.

In step 422, method 400 determines if the video stream is ongoing (e.g., content is still being streamed and displayed on the client device). If so, method 400 returns to step 404 to await further data transmitted from clients. As illustrated, once the video stream has been completed (either due to the stream ending or by the user exiting the stream), method 400 ends.

Although the foregoing embodiments discuss a single user, in some embodiments, the embodiments may equally be appliable to situations where multiple users are captured during a broadcast. For example, if a smart TV camera captures multiple users, each user can be processed according to the foregoing methods.

Figure 5:
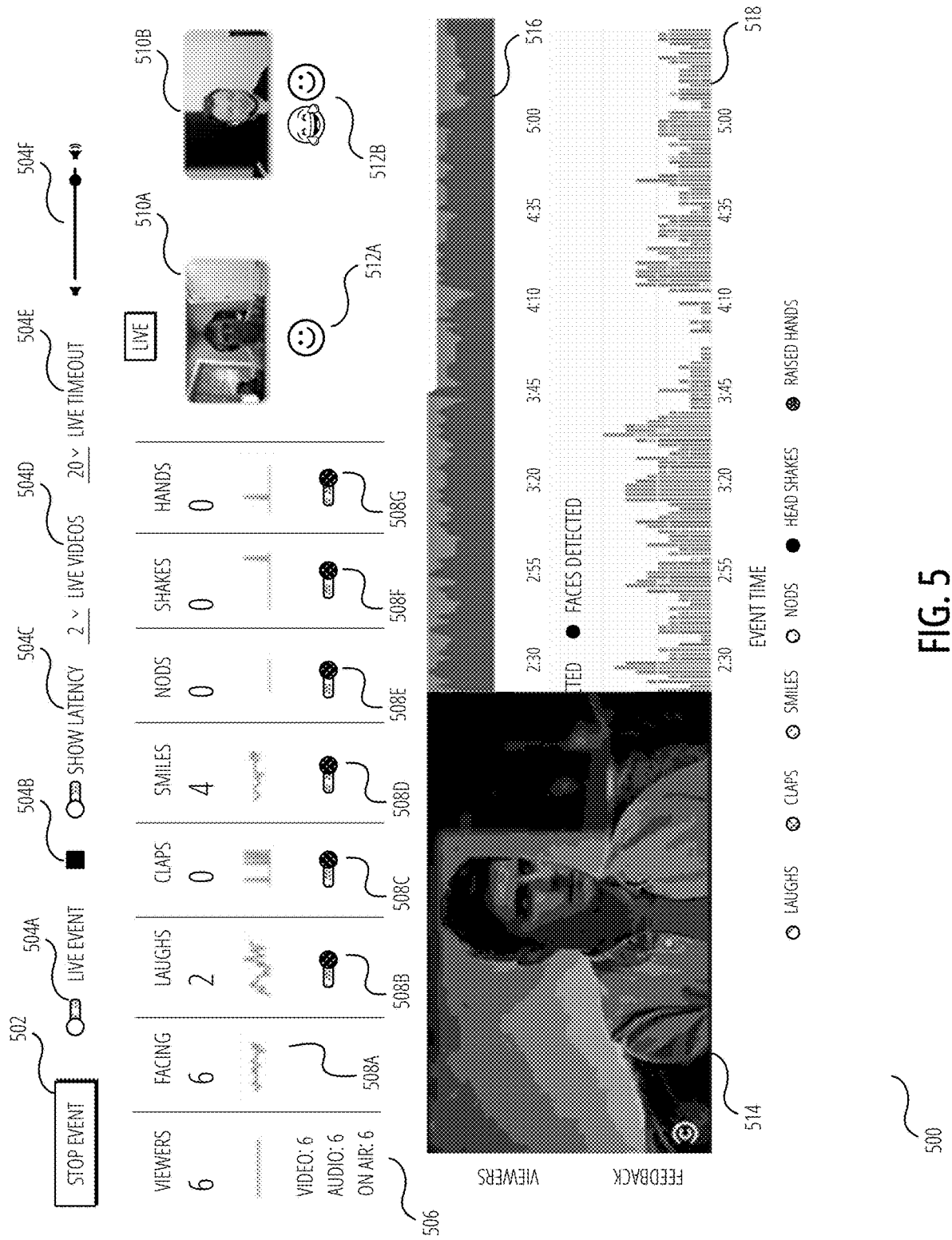
FIG. 5 is a screen diagram illustrating an event stream dashboard according to some of the disclosed embodiments.

FIG. 5 is a screen diagram illustrating an event stream dashboard user interface according to some of the disclosed embodiments.

In the illustrated embodiment, the UI 500 comprises a dashboard view presented to moderators of video streams. A moderator of a video stream comprises any entity broadcasting a video stream. In some embodiments, the moderator may comprise a performer in a live event. In other embodiments, the moderator may comprise a content owner or other entity broadcasting a video stream. The disclosed embodiments are not limited to particular types of moderators. In some embodiments, the UI 500 is provided by the management server 124. In other embodiments, the UI 500 may be provided by a media server in the media cloud 130. In some embodiments, the underlying data used to build the UI 500 may be provided by the management server 124.

In the illustrated embodiment, a plurality of stream controls is presented on the top of the UI 500. Specifically, the controls include a stop event button 502. In the illustrated embodiment, the stop event button 502 allows a moderator to terminate a video stream. In one embodiment, the selection of the stop event button 502 causes an API call to the management server 124 which stops the video stream and disconnects all clients (e.g., via WebRTC signaling) (and thus also stops event detection). A plurality of other controls (e.g., 504a-504f) is illustrated. The controls include a live event toggle 504a which enables broadcasting of live content (e.g., via audio/video capture) and/or switching between live and pre-recorded streams, and a stop button 504b which stops or starts a display of the video 514 in the dashboard, the content of the video 514 comprising the broadcast stream. A latency control 504c enables the display of debugging information, including latency data. A live video control 504d configures the percentage of video slots to use for displaying live client media content (e.g., 510a, 510b). A live timeout control 504e determines the amount of lag time to wait until removing a live client video from the UI 500. In one embodiment, the lag time may be used to determine how long to display media content (e.g., 510a, 510b) when a user's emotion does not change, or a user's emotions are no longer detected. A volume control 504f allows the moderator to adjust the volume of the live videos (e.g., 510a, 510b).

In the illustrated embodiment, a plurality of aggregate panels (e.g., 506, 508a-508g) is displayed. In the illustrated embodiment, a first viewer panel 506 displays the number of connected clients (i.e., the audience). In the illustrated embodiment, six viewers are depicted. In the illustrated embodiment, the first viewer panel 506 includes the number of client devices capturing video for event detection, a number of client devices capturing audio for event detection, and a number of viewers participating in reverse streaming ("On Air") of media content to the management server. In one embodiment, the data in panel 506 is populated by clients reporting a "permission state" which defines which permissions are currently granted during the broadcast, as discussed above. In the illustrated embodiment, the first viewer panel 506 includes a sparkline that displays the aggregate viewer count. In one embodiment, the sparkline is dynamic and changes as the number of connected client devices changes.

In the illustrated embodiment, various aggregate panels 508*a*-508*g*. These panels can correspond to aggregate event detections. As illustrated, the panels 508*a*-508*g* are associated with detected facing events (i.e., that a given user is facing a camera that captured the video), laugh events, clap events, smile events, nodding events, head shake events, and raised hand events, respectively. As discussed previously, these events can be detected locally by the client devices, and the events are transmitted to a remote server. Each of the panels 508*a*-508*g* includes a count value representing the total number of occurrences of the event and a dynamic sparkline that scrolls and plots the occurrences of events over time. Further, some of the panels 508*a*-508*g* include a toggle that enables and disables the collection and/or display of particular events. In an alternative embodiment, the toggles of panels 508*a*-508*g* may enable or disable the display of capture media content, including emotions corresponding to the panels 508*a*-508*g*. Thus, if the user disables the toggle for panel 508*b*, captured media including laughs will not be displayed on the dashboard.

In the illustrated embodiment, the UI 500 includes a plurality of live videos 510*a*, 510*b*. In one embodiment, the live videos 510*a*, 510*b* comprise the video and/or audio reverse streamed from client devices. Further, each of the live videos 510*a*, 510*b* may be associated with one or more icons 512*a*, 512*b* that depict the detected event (or multiple events) in the live videos 510*a*, 510*b*.

In the illustrated embodiment, a video 514 is displayed. In one embodiment, video 514 comprises the video streamed to clients. In some embodiments, video 514 may be hidden or minimized by the moderator.

In the illustrated embodiment, two graphs (graph 516 and graph 518) are displayed. In the illustrated embodiment, both graphs 516, 518 display detected events over time. In the illustrated embodiment, both graphs 516, 518 include the timestamps of the video 514 as the x-axis. In the illustrated embodiment, graph 516 depicts, as one example, a count of all users (light gray) and the number of viewers facing the camera (dark gray) detected across all clients as a function of the video stream time. In the illustrated embodiment, graph 518 depicts, as an example, the number of events (by type) detected across all clients as a function of the video stream time. In the illustrated embodiment, the events depicted in graph 518 include the number of laughs, claps, smiles, nods, head shakes, and raised hands. In one embodiment, graph 516 corresponds to the aggregate depicted in panel 508*a*, while graph 518 corresponds to the aggregates in panels 508*b* through 508*g*. In some embodiments, both graphs 516, 518 may be limited to a fixed window (e.g., the last minute, indicating a current trend) of the broadcast length.

Figure 6:
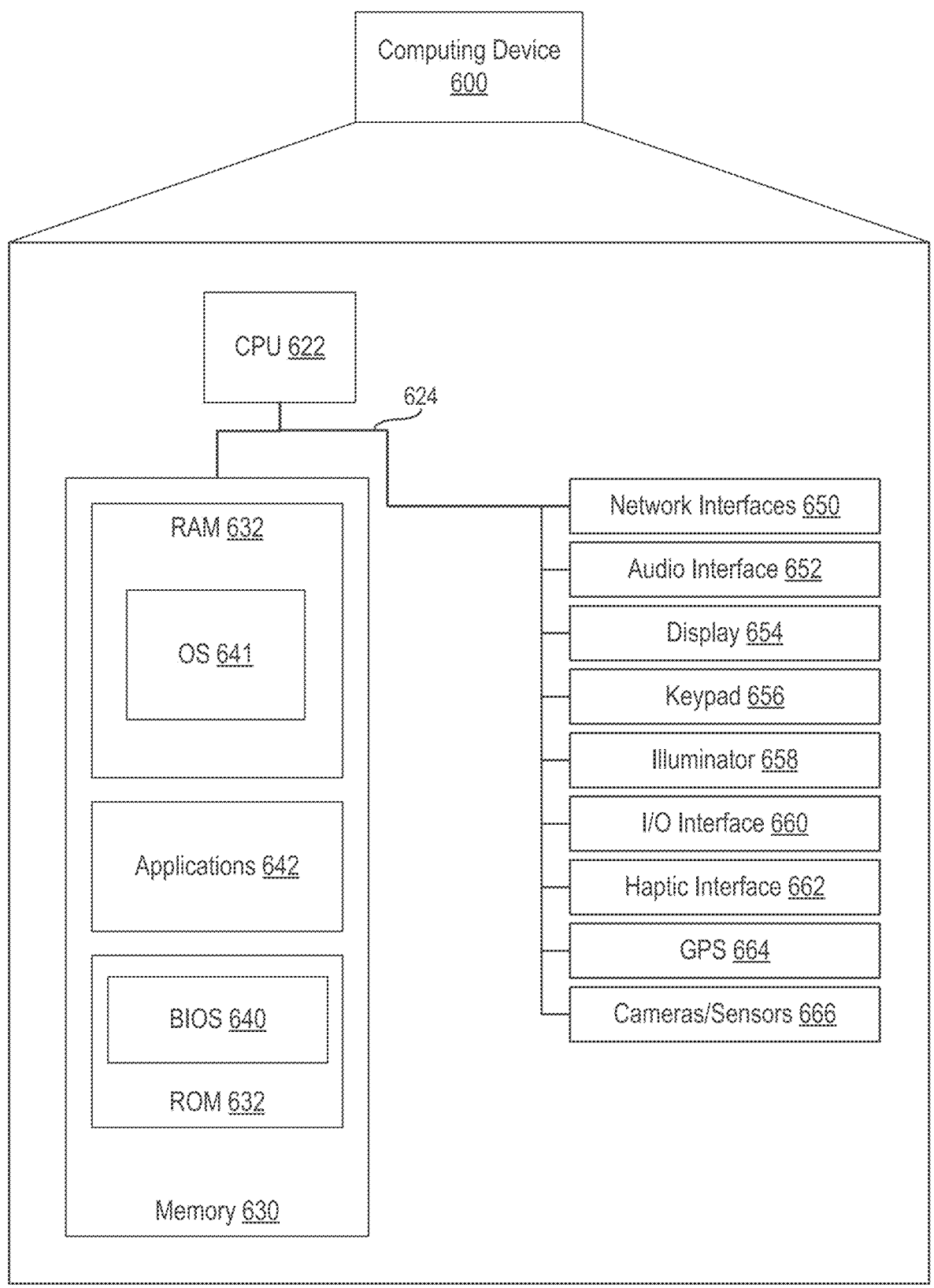
FIG. 6 is a block diagram illustrating a computing device according to some of the disclosed embodiments.

FIG. 6 is a block diagram illustrating a computing device showing an example of a client or server device used in the various embodiments of the disclosure.

The computing device 600 may include more or fewer components than those shown in FIG. 6, depending on the deployment or usage of the device 600. For example, a server computing device, such as a rack-mounted server, may not include an audio interface 652, display 654, keypad 656, illuminator 658, haptic interface 662, Global Positioning Service (GPS) receiver 664, or cameras/sensor 666. Some devices may include additional components not shown, such as graphics processing unit (GPU) devices, cryptographic co-processors, artificial intelligence (AI) accelerators, or other peripheral devices.

As shown in the figure, device 600 includes a central processing unit (CPU) 622 in communication with a mass memory 630 via a bus 624. The computing device 600 also includes one or more network interfaces 650, an audio interface 652, a display 654, a keypad 656, an illuminator 658, an input/output interface 660, a haptic interface 662, an optional global positioning systems (GPS) receiver 664 and a camera(s) or other optical, thermal, or electromagnetic sensors 666. Device 600 can include one camera/sensor 666 or a plurality of cameras/sensors 666. The positioning of the camera(s)/sensor(s) 666 on the device 600 can change per device 600 model, per device 600 capabilities, and the like, or some combination thereof.

In some embodiments, the CPU 622 may comprise a general-purpose CPU. The CPU 622 may comprise a single-core or multiple-core CPU. The CPU 622 may comprise a system-on-a-chip (SoC) or a similar embedded system. In some embodiments, a GPU may be used in place of, or in combination with, a CPU 622. Mass memory 630 may comprise a dynamic random-access memory (DRAM) device, a static random-access memory device (SRAM), or a Flash (e.g., NAND Flash) memory device. In some embodiments, mass memory 630 may comprise a combination of such memory types. In one embodiment, the bus 624 may comprise a Peripheral Component Interconnect Express (PCIe) bus. In some embodiments, bus 624 may comprise multiple busses instead of a single bus.

Mass memory 630 illustrates another example of computer storage media for the storage of information such as computer-readable instructions, data structures, program modules, or other data. Mass memory 630 stores a basic input/output system ("BIOS") 640 for controlling the low-level operation of the computing device 600. The mass memory also stores an operating system 641 for controlling the operation of the computing device 600

Applications 642 may include computer-executable instructions which, when executed by the computing device 600, perform any of the methods (or portions of the methods) described previously in the description of the preceding Figures. In some embodiments, the software or programs implementing the method embodiments can be read from a hard disk drive (not illustrated) and temporarily stored in RAM 632 by CPU 622. CPU 622 may then read the software or data from RAM 632, process them, and store them to RAM 632 again.

The computing device 600 may optionally communicate with a base station (not shown) or directly with another computing device. Network interface 650 is sometimes known as a transceiver, transceiving device, or network interface card (NIC).

The audio interface 652 produces and receives audio signals such as the sound of a human voice. For example, the audio interface 652 may be coupled to a speaker and microphone (not shown) to enable telecommunication with others or generate an audio acknowledgment for some action. Display 654 may be a liquid crystal display (LCD), gas plasma, light-emitting diode (LED), or any other type of display used with a computing device. Display 654 may also include a touch-sensitive screen arranged to receive input from an object such as a stylus or a digit from a human hand.

Keypad 656 may comprise any input device arranged to receive input from a user. Illuminator 658 may provide a status indication or provide light.

The computing device 600 also comprises an input/output interface 660 for communicating with external devices, using communication technologies, such as USB, infrared, Bluetooth™, or the like. The haptic interface 662 provides tactile feedback to a user of the client device.

The optional GPS receiver 664 can determine the physical coordinates of the computing device 600 on the surface of the Earth, which typically outputs a location as latitude and longitude values. GPS receiver 664 can also employ other geo-positioning mechanisms, including, but not limited to, triangulation, assisted GPS (AGPS), E-OTD, CI, SAI, ETA, BSS, or the like, to further determine the physical location of the computing device 600 on the surface of the Earth. In one embodiment, however, the computing device 600 may communicate through other components, provide other information that may be employed to determine the physical location of the device, including, for example, a MAC address, IP address, or the like.

The present disclosure has been described with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, the disclosure is intended to be read to provide a reasonably broad scope for claimed or covered subject matter. Among other things, for example, the subject matter may be embodied as methods, devices, components, or systems. Accordingly, embodiments may, for example, take the form of hardware, software, firmware, or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in some embodiments" as used herein does not necessarily refer to the same embodiment, and the phrase "in another embodiment" as used herein does not necessarily refer to a different embodiment. It is intended, for example, that claimed subject matter includes combinations of example embodiments in whole or in part.

In general, terminology may be understood at least in part from usage in context. For example, terms such as "and," "or," or "and/or," as used herein may include a variety of meanings that may depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms, such as "a," "an," or "the," again, can be understood to convey a singular usage or to convey a plural usage, depending at least in part upon context. In addition, the term "based on" may be understood as not necessarily intended to convey an exclusive set of factors and may, instead, allow for the existence of additional factors not necessarily expressly described, again, depending at least in part on context.

The present disclosure has been described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur in an order different than that noted in the operational illustrations. For example, two blocks shown in succession can, in fact, be executed substantially concurrently, or the blocks can sometimes be executed in the reverse order, depending upon the functionality/acts involved.

For the purposes of this disclosure, a non-transitory computer-readable medium (or computer-readable storage medium/media) stores computer data, which data can include computer program code (or computer-executable instructions) that is executable by a computer, in machine-readable form. By way of example, and not limitation, a computer-readable medium may comprise computer-readable storage media for tangible or fixed storage of data or communication media for transient interpretation of code-containing signals. Computer-readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer-readable storage media includes, but is not limited to, RAM, ROM, EPROM, EEPROM, flash memory or other solid-state memory technology, optical storage, cloud storage, magnetic storage devices, or any other physical or material medium which can be used to tangibly store the desired information or data or instructions and which can be accessed by a computer or processor.

In the preceding specification, various example embodiments have been described with reference to the accompanying drawings. However, it will be evident that various modifications and changes may be made thereto, and additional embodiments may be implemented without departing from the broader scope of the disclosed embodiments as set forth in the claims that follow. The specification and drawings are accordingly to be regarded in an illustrative rather than restrictive sense.

What is claimed is:

1. A method comprising:

receiving, at a client device, a video stream from a remote server;

capturing, via a recording device communicatively coupled to the client device, media content while simultaneously displaying the video stream, wherein the capturing is started upon playback of the video stream;

detecting, by the client device, an event in the media content using a plurality of event detection models executed by the client device, wherein the plurality of event detection models are configured to identify events of different types, the event associated with a label and a confidence level, the confidence level determined based on correlated outputs of the plurality of event detection models, the confidence level dynamically adjusted based on: a correlation of outputs from multiple ones of the plurality of event detection models detecting a multi-event set simultaneously, and a weighting based on historical event detections for a user of the client device;

transmitting, by the client device, the event to the remote server;
transmitting, by the client device, an audiovisual stream captured by the recording device of the client device to the remote server in response to the detecting of the event, the audiovisual stream comprising a reaction to the video stream;
aggregating, by the remote server, the event with at least one other event detected by a second client device during the video stream to generate aggregated statistics based on the event and the at least one other event;
combining, by the remote server, the audiovisual stream with an audiovisual stream comprising a reaction to the video stream received from the second client device; and
transmitting, by the remote server, a dashboard including the combined audiovisual stream and the aggregated statistics to a presenting computing device of the video stream during the video stream, the dashboard displaying dynamic sparklines of event occurrences over time and enables selective enabling and disabling of event detection types.

2. The method of claim 1, wherein detecting, by the client device, an event in the media content using a plurality of event detection models comprises inputting a plurality of frames of the media content into a plurality of machine learning (ML) models, a respective ML model outputting a label and categorizing an action taken by a user in the media content.

3. The method of claim 2, wherein the ML models are selected from the group consisting of a facial expression model, binary reaction model, subject-matter understanding model, eye detection model, head movement model, general movement model, and audio event model.

4. The method of claim 1, further comprising receiving, at the client device, a prompt associated with the video stream and associating the event with the prompt after detecting the event.

5. The method of claim 1, further comprising transmitting, by the client device, the media content to the remote server, the media content comprising captured audio or video for inclusion in the video stream.

6. The method of claim 1, further comprising receiving, by the client device, a request for permission to enable the capturing of media content and determining, by the client device, that the permission is granted before capturing the media content, wherein the permission enables the transmitting the event to the remote server.

7. The method of claim 1, wherein capturing media content while displaying the video stream comprises capturing media content selected from the group consisting of audio, video, and image media content.

8. A non-transitory computer-readable storage medium for tangibly storing computer program instructions capable of being executed by a computer processor, the computer program instructions defining steps of:
receiving a video stream from a remote server;
capturing media content, via a recording device communicatively coupled to a client device, while simultaneously displaying the video stream, wherein the capturing is started upon playback of the video stream;
detecting an event in the media content using a plurality of event detection models executed by the client device, wherein the plurality of event detection models are configured to identify events of different types, the event associated with a label and a confidence level, the confidence level determined based on correlated outputs of the plurality of event detection models, the confidence level dynamically adjusted based on: a correlation of outputs from multiple ones of the plurality of event detection models detecting a multi-event set simultaneously, and a weighting based on historical event detections for a user of the client device;
transmitting the event to the remote server;
transmitting an audiovisual stream captured by the recording device of the client device to the remote server in response to the detecting of the event, the audiovisual stream comprising a reaction to the video stream;
aggregating the event with at least one other event detected by a second client device during the video stream to generate aggregated statistics based on the event and the at least one other event;
combining the audiovisual stream with an audiovisual stream comprising a reaction to the video stream received from the second client device; and
transmitting a dashboard including the combined audiovisual stream and the aggregated statistics to a presenting computing device of the video stream during the video stream, the dashboard displaying dynamic sparklines of event occurrences over time and enables selective enabling and disabling of event detection types.

9. The non-transitory computer-readable storage medium of claim 8, wherein detecting an event in the media content using a plurality of event detection models comprises inputting a plurality of frames of the media content into a plurality of machine learning (ML) models, a respective ML model outputting a label and categorizing an action taken by a user in the media content.

10. The non-transitory computer-readable storage medium of claim 9, wherein the ML models are selected from the group consisting of a facial expression model, binary reaction model, subject-matter understanding model, eye detection model, head movement model, general movement model, and audio event model.

11. The non-transitory computer-readable storage medium of claim 8, the computer program instructions further defining a step of receiving a prompt associated with the video stream and associating the event with the prompt after detecting the event.

12. The non-transitory computer-readable storage medium of claim 8, the computer program instructions further defining a step of transmitting the media content to the remote server, the media content comprising captured audio or video for inclusion in the video stream.

13. The non-transitory computer-readable storage medium of claim 8, the computer program instructions further defining a step of receiving a request for permission to enable the capturing of media content and determining that the permission is granted before capturing the media content, wherein the permission enables the transmitting the event to the remote server.

14. The non-transitory computer-readable storage medium of claim 8, wherein capturing media content while displaying the video stream comprises capturing media content selected from the group consisting of audio, video, and image media content.

15. A system comprising:
a remote server; and
a client device configured to:
receive a video stream from the remote server;
capture media content, via a recording device communicatively coupled to the client device, while simultaneously displaying the video stream, wherein the capturing is started upon playback of the video stream;

detect an event in the media content using a plurality of event detection models executed by the client device, wherein the plurality of event detection models are configured to identify events of different types, the event associated with a label and a confidence level, the confidence level determined based on correlated outputs of the plurality of event detection models, the confidence level dynamically adjusted based on: a correlation of outputs from multiple ones of the plurality of event detection models detecting a multi-event set simultaneously, and a weighting based on historical event detections for a user of the client device; and transmit the event to the remote server and transmitting an audiovisual stream captured by the recording device of the client device to the remote server in response to the detecting of the event, the audiovisual stream comprising a reaction to the video stream, wherein the remote server is configured to aggregate the event with at least one other event detected by a second client device during the video stream to generate aggregated statistics and combine the audiovisual stream with an audiovisual stream comprising a reaction to the video stream received from the second client device and transmitting a dashboard including the combined audiovisual stream and the aggregated statistics to a presenting computing device of the video stream during the video stream, the dashboard displaying dynamic sparklines of event occurrences over time and enables selective enabling and disabling of event detection types.

16. The system of claim 15, wherein detecting an event in the media content using a plurality of event detection models comprises inputting a plurality of frames of the media content into a plurality of machine learning (ML) models, a respective ML model outputting a label and categorizing an action taken by a user in the media content.

17. The system of claim 16, wherein the ML models are selected from the group consisting of a facial expression model, binary reaction model, subject-matter understanding model, eye detection model, head movement model, general movement model, and audio event model.

18. The system of claim 15, the client device further configured to receive a prompt associated with the video stream and associating the event with the prompt after detecting the event.

19. The system of claim 15, the client device further configured to transmit the media content to the remote server, the media content comprising captured audio or video for inclusion in the video stream.

20. The system of claim 15, wherein capturing media content while displaying the video stream comprises capturing media content selected from the group consisting of audio, video, and image media content.

\* \* \* \* \*